United States Patent
Nichols et al.

(10) Patent No.: US 12,343,893 B2
(45) Date of Patent: Jul. 1, 2025

(54) REMOTELY OPERATED CUTTING DEVICE

(71) Applicant: Altec Industries, Inc., Birmingham, AL (US)

(72) Inventors: Robert Nichols, Saint Joseph, MO (US); Jonathan Westin Sykes, Gower, MO (US); Timothy J. Mourlam, Kansas City, KS (US); Douglas E. Frazier, Auburn, NH (US); Stephen J. Driscoll, Brant Rock, MA (US); Timothy L. McHugh, Bridgewater, NH (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/238,221

(22) Filed: Aug. 25, 2023

(65) Prior Publication Data
US 2025/0065526 A1    Feb. 27, 2025

(51) Int. Cl.
*B26D 5/08*    (2006.01)
*A01G 3/08*    (2006.01)
(Continued)

(52) U.S. Cl.
CPC ............. *B26D 5/086* (2013.01); *B26D 5/007* (2013.01); *B26D 7/26* (2013.01); *A01G 3/08* (2013.01)

(58) Field of Classification Search
CPC .......... B26D 5/086; B26D 5/007; B26D 7/26; A01G 3/08; B66C 15/065; G05B 9/02
See application file for complete search history.

(56) References Cited

U.S. PATENT DOCUMENTS 3,590,894 A * 7/1971 Boyd .................. A01G 23/085
                                                     144/34.5
3,720,246 A * 3/1973 David .................. A01G 23/083
                                                     144/24.13
(Continued)

FOREIGN PATENT DOCUMENTS

CN      106711847 A      5/2017
CN      110741827 A      2/2020
(Continued)

OTHER PUBLICATIONS

KR-100972741-B1 translation, 2010.*
(Continued)

*Primary Examiner* — Jonathan G Riley
(74) *Attorney, Agent, or Firm* — Erise IP, P.A.

(57) ABSTRACT

Systems and methods for cutting aerial objects by a remotely operated cutting system disposed on a boom tip of an aerial device are disclosed. In some embodiments, a remotely operated cutting system may be operable to translate and rotate in three dimensions to obtain an optimal cutting position. The cutting device may be configured to cut tree limbs, power lines, metal bars, or the like. A sensor may detect electrical energy in proximity to a cutting location associated with the cutting device. The cutting device may be controlled by an operator at a remote location communicatively connected to control the cutting device and view the cutting device by a camera mounted on the boom tip or the cutting system. The cutting device may further be automatically operated based on stored computer-executable instructions.

16 Claims, 7 Drawing Sheets

(51) Int. Cl.
   *B26D 5/00*      (2006.01)
   *B26D 7/26*      (2006.01)

(56) References Cited

U.S. PATENT DOCUMENTS

| | | | | |
|---|---|---|---|---|
| 4,069,848 | A * | 1/1978 | Coatta | A01G 23/089 |
| | | | | 144/34.5 |
| 5,174,350 | A * | 12/1992 | Johansson | A01G 23/08 |
| | | | | 144/34.1 |
| 5,390,715 | A * | 2/1995 | Luscombe | A01G 3/08 |
| | | | | 144/34.1 |
| 6,600,426 | B1 * | 7/2003 | Sacks | B60P 1/00 |
| | | | | 340/684 |
| 8,866,469 | B2 * | 10/2014 | Parr | G01B 7/14 |
| | | | | 324/207.22 |
| 9,501,930 | B2 * | 11/2016 | Smith | G01R 29/085 |
| 10,175,091 | B2 * | 1/2019 | Mueller | B66C 15/065 |
| 11,150,648 | B2 * | 10/2021 | Bharatiya | A01M 7/0075 |
| 11,447,380 | B1 * | 9/2022 | Thompson | B66F 17/006 |
| 2007/0180740 | A1 * | 8/2007 | Crowley, Jr. | A01G 23/089 |
| | | | | 37/302 |
| 2010/0214094 | A1 * | 8/2010 | Givens | E02F 9/24 |
| | | | | 340/3.7 |
| 2016/0205872 | A1 * | 7/2016 | Chan | A01G 3/086 |
| 2019/0235001 | A1 * | 8/2019 | Cosgrove | B66F 17/006 |
| 2020/0347991 | A1 * | 11/2020 | Pellenc | A01G 3/085 |
| 2021/0079628 | A1 * | 3/2021 | Wiethorn | E02F 9/267 |
| 2021/0331321 | A1 * | 10/2021 | Sykes | B25J 9/1697 |
| 2022/0338419 | A1 * | 10/2022 | Caruso | A01G 3/053 |
| 2023/0189729 | A1 * | 6/2023 | Boutte | A01G 23/095 |
| | | | | 144/24.13 |

FOREIGN PATENT DOCUMENTS

| | | | | |
|---|---|---|---|---|
| CN | 112385429 | A | | 2/2021 |
| EP | 2612738 | A1 | | 7/2013 |
| EP | 3711909 | A2 * | 9/2020 | B25J 9/1697 |
| KR | 100972741 | B1 * | 7/2010 | B26B 15/00 |
| WO | 2022038566 | A1 | | 2/2022 |

OTHER PUBLICATIONS

EP-3711909-A2 translation (Year: 2020).*
PCT Patent Application PCT/US2024/42048 International Search Report and Written Opinion of the International Searching Authority issued Dec. 16, 2024.

* cited by examiner

REMOTELY OPERATED CUTTING DEVICE

BACKGROUND

1. Field

Embodiments of the disclosure relate to a mechanical cutting device. More specifically, embodiments of the disclosure relate to an aerial cutting device configured to detect electrical power.

2. Related Art

Typically, standard aerial devices provide aerial platforms, or buckets, for users to perform elevated work on power lines and associated power distribution components. In some instances, hurricanes, tornados, ice storms, snowstorms, and other weather phenomena can damage the power distribution "grid" impacting thousands and even millions of people. When a storm impacts an area, trees and power lines may be damaged or downed. Public and private companies may deploy aerial devices to clean up the affected area before maintenance workers arrive to fix the power lines and get the grid operational. If the cleanup crew is slow to do their job, delays may impact people who are without necessary power for their homes.

Generally, the above-described cleanup crew may comprise a plurality of workers that are lifted in the aerial platforms to cut and remove trees, tree limbs, and cut power lines, replace transformers, insulators, and the like. In some scenarios the power lines may be "live" or may still retain power that may be precarious to work around. In some cases, it may be necessary to have highly skilled workers performing these duties. As such, the time required to clean up after a storm may be dependent upon the number of highly skilled workers capable and available for performing the cleanup job.

What is needed are systems and methods of providing a quick and reliable cleanup method that takes the worker out of the aerial platform and allows for remote operations. Furthermore, what is needed are systems and methods that may be operated by less skilled workers such that more aerial devices can be in operation simultaneously resulting in quicker and more efficient cleanup processes.

SUMMARY

Embodiments of the invention solve the above-mentioned problems by providing remote operation of a cutting system. The cutting system may comprise a cutting device disposed on a boom tip of an aerial device and may be operated by a remote user. The cutting system may comprise a plurality of actuators for aligning the cutting device, a power source for powering the cutting device, and at least one controller for operating the cutting system. Furthermore, the cutting system may comprise sensors, such as cameras and electrical sensors for detecting electric current or electric potential. When electrical energy is detected proximate the cutting device, systems of the cutting system and the aerial system may be locked or shut down to avoid electrical discharge. Furthermore, the cutting system may comprise wireless and fiber optic communications to maintain electrical insulation between the cutting system and a base of the aerial device.

A first embodiment of the disclosure is directed to a remotely operated cutting system attached to a boom tip of an aerial device. The remotely operated cutting system comprises a cutting device comprising, one or more cutting blades for cutting, a plurality of actuators configured to cause the cutting device to rotate and translate to a cutting position, a power source providing energy for operation of the one or more cutting blades for cutting, a sensor configured to detect electrical energy, and a controller configured to prevent the cutting device from cutting when the electrical energy is detected.

A second embodiment of the disclosure is directed to a remotely operated cutting system attached to a boom tip of an aerial device. The remotely operated cutting system comprises a cutting device comprising one or more cutting blades for cutting, a plurality of actuators configured to cause the cutting device to move to a cutting position, a remote control operable by a remote operator to control the cutting device at the boom tip, a power source providing energy to the one or more cutting blades for cutting, wherein the power source is disposed at the boom tip to maintain electrical insulation between the boom tip and a base of the aerial device, a sensor configured to detect electrical energy, a controller configured to receive an output of the sensor, determine that the electrical energy was detected, and cause an action based on the detection of the electrical energy.

A third embodiment of the disclosure is directed to a method of cutting an object by a remotely operated cutting device attached to a boom tip of an aerial device. The method comprises moving, by a plurality of actuators, a cutting device into a cutting position, detecting, by a sensor, electrical energy at a cutting point associated with the cutting device, wherein the sensor is disposed proximate the cutting device, and preventing the cutting device from cutting based on the detecting of the electrical energy.

A fourth embodiment of the disclosure in combination with the first embodiment, the second embodiment, or the third embodiment comprises a remote control operable to remotely control the cutting device, wherein the plurality of actuators is configured to provide at least roll, pitch, and yaw to the cutting device for moving the cutting device into the cutting position, a base mounting bracket providing rotation to the cutting device, wherein the sensor is coupled to the base mounting bracket and rotates with the cutting device to maintain a sensor position relative to the cutting device, wherein the sensor is calibrated to detect the electrical energy at a cutting point associated with the cutting device, wherein the power source is a motor (e.g., power take-off (PTO), pump), and wherein the one or more cutting blades are operated by an internal cylinder under hydraulic power generated by the motor.

A fifth embodiment of the disclosure in combination with the first embodiment, the second embodiment, or the third embodiment, and the fourth embodiment comprises the controller further configured to automatically actuate the cutting device to retreat from an electrical energy source when the electrical energy is detected, determining, by object recognition, an object in the image, and determining, using the object recognition and data from the sensor, that the object is a source of the electrical energy, wherein the image is obtained from a camera disposed at the boom tip transmitting the image to the operator remotely operating the cutting device.

A sixth embodiment of the disclosure in combination with the first embodiment, the second embodiment, or the third embodiment, and/or the fourth embodiment and/or the fifth embodiment comprises a plurality of sensors configured to detect the electrical energy, wherein the controller is further configured to determine a three-dimensional position of a source of the electrical energy when the electrical energy is detected, wherein the power source is a motor (e.g., power take-off (PTO), pump), and wherein the one or more cutting blades are operated by an internal cylinder under hydraulic power generated by the motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
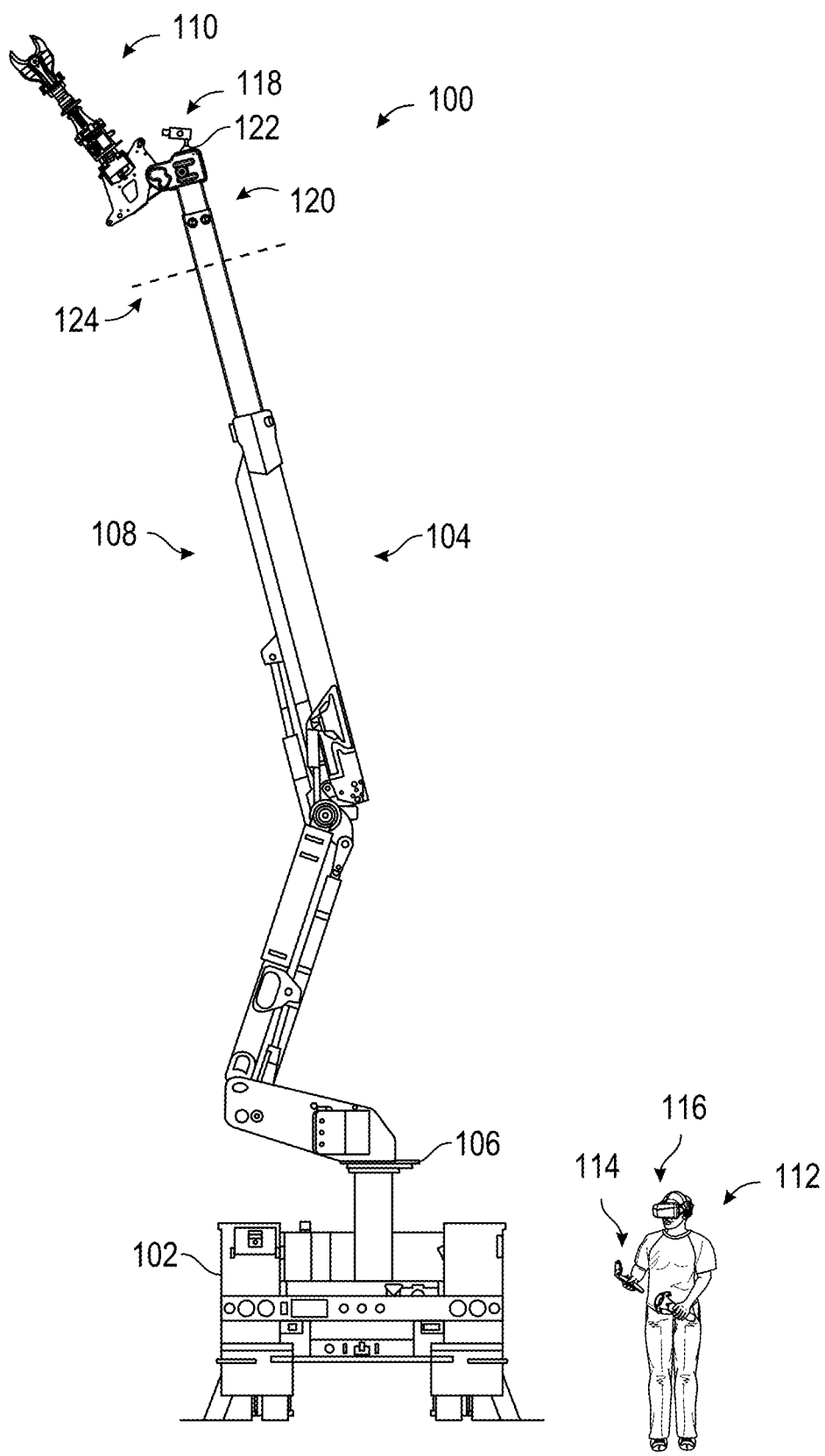
FIG. 1 depicts an insulating aerial device with a cutting device implement.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to a cutting system that may be disposed on a boom end of an aerial device. The cutting system may comprise a cutting device configured to cut vegetation and/or power lines, cables, steel bars, and the like. The cutting device may be configured to cut metal, wood, plastic, or any other material and may be used by utility crews, first responders, or the like. In some embodiments, the cutting device may be disposed at an end of a boom of an aerial device. The aerial device may be configured for performing electrical work or may be a fire truck, ambulance, crane, digger derrick, boom truck, or any other utility vehicle or platform.

In some embodiments, the cutting system may be configured to be operated remotely. For example, the cutting system may be operated by a remote control in wireless communication. The remote control may be a hand-held controller and operated by a user positioned on the ground, in a cab, or at any remote location away from any potentially high-voltage areas. Furthermore, a system comprising any boom to which the cutting device may be attached may be operated by the remote control.

In some embodiments, the cutting system may comprise actuators, sensors, transmitters, receivers, at least one processor, and one or more computer-readable media storing computer-executable instructions that, when executed by the at least one processor, perform the methods described herein. The cutting system components may be positioned at the end of the boom along with the cutting device or at the base and may communicate wirelessly or by fiber optics such that an electrical insulation between the boom tip and the base is maintained.

In some embodiments, the sensor is configured to detect a magnetic and/or electric field. The sensor may be configured to detect direction and magnitude of the electric field. In some embodiments a plurality of sensors may be used such that a three-dimensional position of a source may be determined. The sensor may be positioned to detect the electric field at, or close to, the cutting device. The sensor may be attached to a mounting bracket to rotate and translate with the cutting device such that the sensor is always positioned relative to the cutting device to detect the electric field at the cutting device.

In some embodiments, a threshold electrical energy is stored to control a cutting device interlock. The sensor may detect voltage (e.g., an electric field) from the alternating current (AC) of power lines. When the voltage is high enough, a controller may actuate the cutting device interlock to prevent the cutting device interlock from operating. Other functions of the aerial device and the cutting device may remain operational to move the cutting device away from the source of the electrical power.

Turning first to FIG. 1, aerial device 100 for some embodiments of the invention is depicted. Aerial device 100 may be attached to utility vehicle 102, as shown. In some embodiments, aerial device 100 comprises boom assembly 104, upper boom section 108, and boom implement 110 attached at boom tip 120. Additionally, aerial device 100 comprises turntable 106 disposed on utility vehicle 102, as shown. As aerial device 100 is operated near electrically powered cables, in some embodiments, boom implement 110 and boom assembly 104 comprise insulating material for insulating aerial device 100. Furthermore, any electrical components disposed on boom implement 110 and on boom assembly 104 may be self-contained and electrically isolated from the electrical components of utility vehicle 102. As such, a dielectric gap 124 may be created between boom implement 110 and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and boom implement 110.

In some embodiments, operator 112 may be positioned on boom implement 110 when boom implement 110 is a utility platform for performing work on or near high-voltage power lines. Operator 112 may access upper controls disposed on a utility platform as well as hydraulic tools for performing the work. In some embodiments, operator 112 on utility platform may move to various positions using the upper controls. Furthermore, lower controls may be utilized at the base of aerial device 100 such as at utility vehicle 102 and at turntable 106. As shown, operator 112 is operating hand controls 114. Hand controls 114 may be any controller that may send a signal to aerial device 100 to control movement of boom assembly 104, utility vehicle 102, and boom implement 110.

Figure 2:
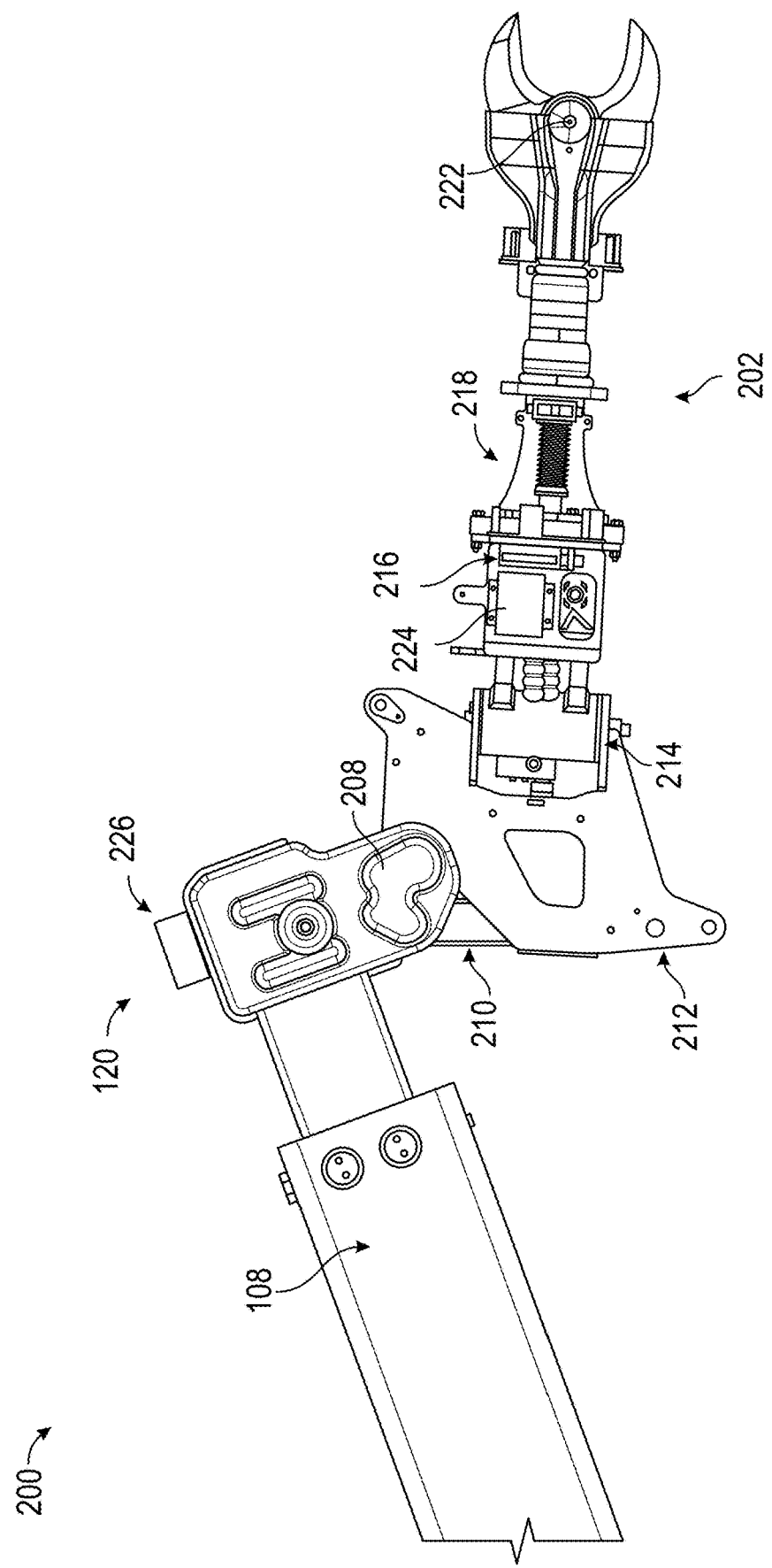
FIG. 2 depicts an embodiment of a cutting system.

In some embodiments, operator 112 may wear head-mounted display 116. Head-mounted display 116 may be connected to camera 118, which may be one of a plurality of sensors of cutting system 200 (FIG. 2). Camera 118 may be disposed on boom tip 120 proximate boom implement 110, which may be cutting device 202 (FIG. 2). In some embodiments, a display may be mounted on a control board (not shown) that displays the images from camera 118.

In some embodiments, camera 118 may be connected to and communicate via a fiber-optic cable (not shown). The fiber-optic cable may be disposed between any device of boom implement 110 and any base components. In some embodiments, the fiber-optic cable is included to communicate signal across a dielectric gap. In some embodiments, the fiber-optic communication may provide high data transmission speed to reduce lag between camera 118 and head-mounted display 116. Further, in some embodiments, a plurality of fiber-optic cables may be used to maintain the dielectric gap between aerial components and base components. In some embodiments, any of the communication described herein may also be performed using wireless communication between transceivers at the hand controls 114, head-mounted display 116, and aerial device 100.

Head-mounted display 116 may comprise at least one sensor for detecting a viewing angle and/or viewing position of operator 112 such as, for example, a three-axis accelerometer. Furthermore, head-mounted display 116 may comprise a visual display, speakers, microphone, and any necessary processors, data storage, and communication devices described in relation to the hardware components of FIG. 7. Head-mounted display 116 may be configured to be worn by operator 112. In some embodiments, head-mounted display 116 may be connected to a processor for processing the image signal. Alternatively, the processor may be disposed anywhere on aerial device 100 or on hand controls 114. Further, the processor may be part of a central computer, which may be disposed on utility vehicle 102 or in another remote location. In some embodiments, a plurality of processing elements or processors may be used. Additionally, the plurality of processing elements may be distributed across various locations including cutting system 200.

In some embodiments, camera 118 may comprise a plurality of cameras 226 (FIG. 2.) detecting visual light, infrared light, or may be a specialized camera such as cloud point for detecting depth. In some embodiments, camera 118 comprises a gimbal mount 122 allowing rotation of camera 118 to view 360 degrees. Gimbal mount 122 may provide three-axis rotation and may be rotated by a motor or a plurality of motors on gimbal mount 122. In some embodiments, three motors are operable to control roll, pitch, and yaw of camera 118. Camera 118 may be communicatively connected to head-mounted display 116 such that operator 112 sees the images from camera 118. Furthermore, the position sensors in head-mounted display 116 may be operable to relay information to camera 118 such that camera 118 moves according to the motion of the head of operator 112. In some embodiments, camera may be a plurality of cameras pointing different directions providing a 180-degree view that may be stitched together to provide a wide-angle view to operator 112.

In some embodiments, cutting system 200 comprises cutting device 202, sensor 306 (FIG. 3), controller 312 (FIG. 3), and a plurality of actuators for positioning cutting device 202 relative to an object to be cut. Cutting device 202 may be positioned by operator 112 controlling boom assembly 104 and a plurality of cutter actuators that provide from three to six degrees of freedom to cutting device 202. For example, cutting device 202 may translate and rotate relative to a standard three-dimensional x, y, and z, orthogonal coordinate system. This allows cutting device 202 to approach an object to be cut at any angle in three dimensions. As such, cutting device 202 provides versatility when cutting objects at a position elevated above the ground like power lines, tree limbs, window bars, and the like, that may be positioned at various angles.

In some embodiments, the position of cutting device 202 and the two to six degrees of freedom may be provided by plurality of actuators. In some embodiments, cutting device may operate above six-degrees of freedom. The plurality of actuators may comprise any boom extension and rotational actuators as well as any actuators associated with cutting device 202 and the connection between cutting device 202 and boom assembly 104. For example, in some embodiments, cutting device 202 may rotate about a transverse axis at boom end rotation actuator 208. Boom end rotation actuator 208 may cause a pitching motion of cutting device 202. In some embodiments, cylinder 210 may extend between boom tip 120 and implement attachment bracket 212 to rotate cutting device 202 in a pitching motion. Furthermore, a yawing motion may be created by actuating either or both yaw boom actuator 214 and/or yaw cutter actuator 216. Further still, rolling motion may be generated by actuating cutter roll actuator 218. As such, the rotation and translation provided by boom assembly 104 may provide macro adjustments and the actuators at the boom tip 120 in conjunction with the plurality of cutting device actuators may provide micro adjustments. This allows cutting device 202 to align with the object to be cut as desired by operator 112.

In some embodiments, to allow operator 112 to position cutting device 202 in a position to perform an optimal cut of the object to be cut, one or more sensors may be disposed on aerial device 100, boom assembly 104, and/or cutting device 202. In some embodiments, the one or more sensors comprises camera 118. Camera 118 may be any camera type including any digital, analog, mirrored or mirrorless, red-green-blue (RGB), infrared, radio, point cloud, or the like. In some embodiments, camera 118 may be a plurality of cameras 226 (FIG. 2.) in any combination of the camera types mentioned. Camera 118 may transmit images and video to operator 112 remotely controlling cutting device 202. The camera images and video may be caused for display at a monitor, or head-mounted display 116 associated with operator 112. Furthermore, camera 118 may comprise motors and a processor for controlling camera 118 based on the head movements of operator 112 moving head-mounted display 116. In some embodiments, camera 118 may be controlled by hand controls 114 or by a joystick when hand controls 114 are in a camera mode of operation.

Figure 3:
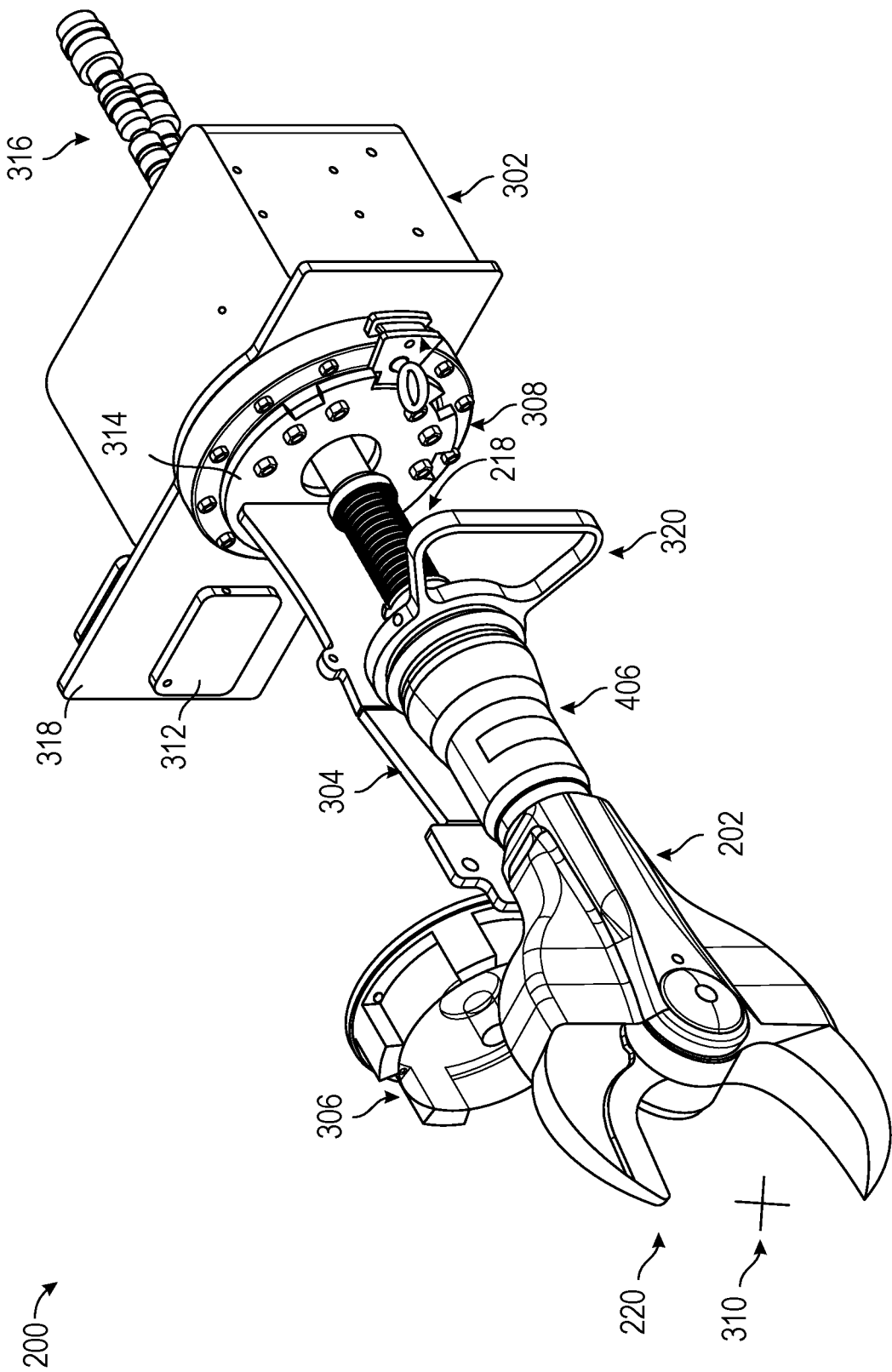
FIG. 3 depicts an embodiment of the cutting system.

In some embodiments, cutting device 202 comprises cutting blades 220, which, in some embodiments, comprise a shearing mechanism as shown in FIGS. 1-3. The shearing mechanism may comprise two opposing blades that slide next to each other in a scissor motion pivoting around a pivot joint 222 as shown. In some embodiments, cutting blades 220 may be any blade, shearing device, saw, chainsaw, or any other type of cutting mechanism. In some embodiments, cutting blades 220 may be operable to cut aluminum conductor, steel conductor, data transmission wires/fiber optics, vines, branches, steel bars, plastic, or any other material that may be cut in the embodiments described herein.

In some embodiments, power to provide cutting force to cutting device 202 may come from power source 224 positioned at boom tip 120, base, or on the ground. Power source 224 may be a fuel-powered motor, electric motor, hydroelectric motor, battery, or the like. The energy from power source 224 may be transferred to cutting device 202 by electricity, hydraulics, pneumatics, mechanics, or the like. In some embodiments, power source 224 may be provided at boom tip 120 to maintain electrical insulation between boom tip 120 proximate high-voltage power lines and the ground. Each actuator of the plurality of actuators may comprise an independent motor drawing hydraulic fluid from a sump to operate each actuator. In some embodiments, power source 224 may be a battery and the plurality of actuators may be electromechanical actuators.

FIG. 3 depicts a perspective view of an embodiment of cutting system 200. Cutting device 202 may rotate relative to mount 302 and base plate 318. In some embodiments, power source 224 may be disposed inside of mount 302. Furthermore, bracket 304 may connect cutting device 202 to sensor 306 via base mounting bracket 314 attached to bearing 308. Therefore, when cutting device 202 rotates about cutter roll actuator 218, sensor 306, bracket 304, and base mounting bracket 314 also rotate. The rotation may be provided by bearing 308 working in conjunction with cutter roll actuator 218.

In some embodiments, sensor 306 may be attached to bracket 304. Therefore, as cutting device 202 rotates to align with an object as controlled by operator 112, sensor 306 similarly rotates. Therefore, sensor 306 is always in a same position relative to cutting device 202. This allows sensor 306 to be calibrated based on the relative location to cutting device 202. Specifically, sensor 306 may be configured to detect electrical energy at point 310. In some embodiments, sensor 306 may be configured to detect electrical current and/or electrical potential. Operator 112 may instruct boom assembly 104 and cutting device 202 to a location to optimally position cutting device 202 for cutting an object such as, for example, fallen power lines. Sensor 306 may detect electrical energy in the power lines and operation of cutting device 202 may be automatically shut down.

Sensor 306 may be optimally positioned to detect electrical energy at point 310 and may be any sensor capable of detecting any range of voltage or current. Though voltage is discussed herein, sensor 306 may be configured to detect any component of electrical energy or resistance. In some embodiments, sensor 306 may be positioned based on the type of sensor. For example, sensor 306 may detect current and may be positioned to optimally detect current in any nearby power line, transformer, or any other component. Alternatively, in some embodiments, sensor 306 may detect an electric field. Sensor 306 may detect the electric field without requiring current to be flowing through the conductor when the conductor carries AC power. Sensor 306 may detect an electrical gradient caused by the electrical potential alternating between positive and negative.

Sensor 306 may be most sensitive to an electrical field in a particular direction. Therefore, sensor 306 may be specifically aligned with the end or center of cutting device 202 to optimally detect the electric field at point 310. Sensor 306 moves with cutting device 202. Therefore, sensor 306 stays aligned with cutting device 202 such that the most sensitive direction of detection is always aligned with point 310.

Some embodiments described herein may be performed utilizing at least one controller such as controller 312. Controller 312 may comprise non-transitory computer-readable media storing computer-executable instructions that, when executed by at least one processor either on or associated with controller 312, perform the computerized methods described herein. Controller 312 may be communicatively connected to sensor 306 as well as to various processors, data storage devices, transmitters, receivers, actuators, and the like. In some embodiments, controller 312 is hardware platform 700 depicted in FIG. 7. Controller 312 may receive the output of sensor 306, determine if voltage has been detected (e.g., if high voltage is detected), and control various actuators (e.g., the plurality of actuators) and alerts based on the detection.

Furthermore, controller 312 may comprise electrically insulated communication systems as well as independent power systems. As described above, boom tip 120 may be electrically insulated from any ground components such as base, utility vehicle 102, operator 112, hand controls 114, and the like. Therefore, independent power systems and electrically insulated communication systems may be necessary for communication between controller 312 and the plurality of actuators and controls at ground level. A power system (e.g., power source 224) supplying power to various components at boom tip 120 may be any battery or motor disposed at boom tip 120 and not directly mechanically or directly electrically connected to the base. Power and communication may be provided by plurality of lines 316 that may be hydraulic lines, electric lines, fiber optic lines, or the like.

In some embodiments, controller 312 may control various actuators to perform tasks based on the detection of high voltage. For example, cutting device 202 may be in a cutting state prior to detection of electrical energy. If electrical energy is determined by controller 312 to have been detected, or to have been detected above a minimum threshold value, by sensor 306, an interlock may be actuated to prevent cutting blades 220 of cutting device 202 from actuating. In some embodiments, cutting device 202 may be in a locked state and may require unlocking by operator 112. If sensor 306 detects electrical energy or a voltage or current above a threshold value, the cutting device may not be unlocked until the electrical energy is below the threshold value or is not detected.

Furthermore, in some embodiments, some aerial device operations may be limited. For example, boom assembly 104 may only be allowed to actuate to bring cutting device 202 back and away from any detected electrical energy. Similarly, boom assembly 104 may only be operated to bring cutting device 202 back down to the ground. Furthermore, boom operations may be slowed such that no jerking or bouncing could result in contact with the electrical energy source. Any aerial device operations may be locked or limited based on detection of electrical energy and on a magnitude of the electrical energy compared to a threshold value. Similarly, any aerial device operations may be locked or limited based on a location of the detected electrical energy or on a magnitude of the electrical energy compared to a threshold value.

In some embodiments, a second sensor such as, for example, camera 118 may be used along with object recognition algorithms operable by controller 312 to detect objects in the field of view. Object detection may be utilized along with electrical energy detection to determine the source of the electrical energy and automatically operate cutting device 202 away from the electrical energy source. In an exemplary embodiment, referencing FIG. 5, cutting device 202 may be used to cut tree limbs 502 near downed power lines 504. As cutting device 202 is navigated toward tree limbs 502 high voltage (e.g., electric field) may be detected by sensor 306 and controller 312. Controller 312 may then control various operations of aerial device 100 based on the detected high voltage.

Furthermore, camera 118 may view the operational environment including the tree limbs 502 and power lines 504. The location of the detected high voltage may be the location of power lines 504 in the image from camera 118. As such, controller 312 may determine that the power lines 504 are emitting the electric field and cutting device 202 may be automatically moved away from power lines 504 by controller 312 actuating the appropriate actuators (e.g., boom assembly 104 and the plurality of actuators) of aerial device 100. In some embodiments, a plurality of sensors may be operable to transmit data to controller 312, and controller 312 may activate or deactivate any actuators to place aerial device 100 at a distance from the detected high voltage.

In some embodiments, haptic and audible signals may be transmitted to operator 112, utility vehicle 102, or a remote location. Controller 312 may be further operable to actuate haptics and audible signals to alert operator 112 and anyone in the vicinity of aerial device 100. Haptic feedback such as shaking, or vibrating may be generated by hand controls 114 initiated by a signal from controller 312 when electrical energy is detected at sensor 306. In some embodiments, messages may be sent, and data may be recorded of the electrical energy detection event for review in the future. In some embodiments, the range for the sensor may be anywhere from one foot to several feet depending on the sensitivity of the sensor and the strength of the electrical energy.

Figure 4B:
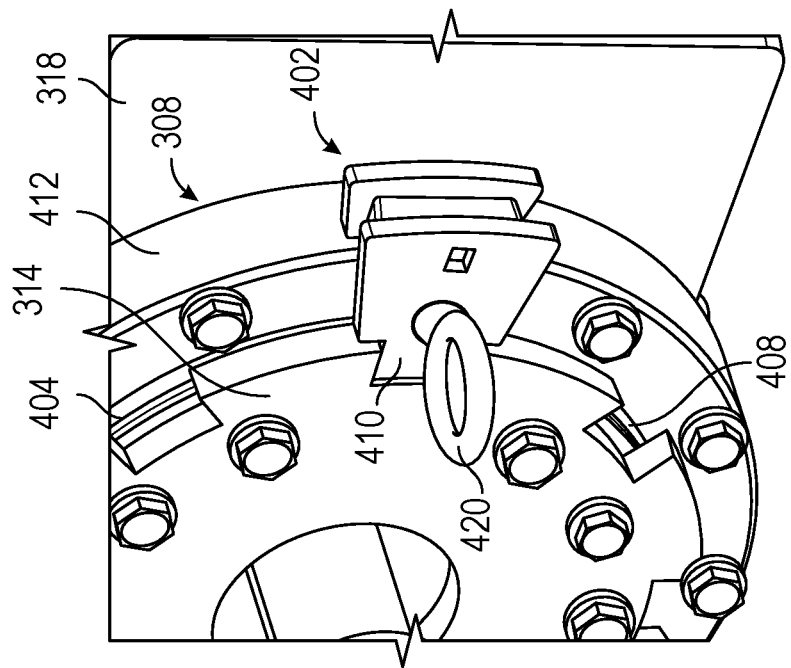
FIGS. 4A-4B depict an embodiment of a locking mechanism for the cutting device.
Figure 4A:
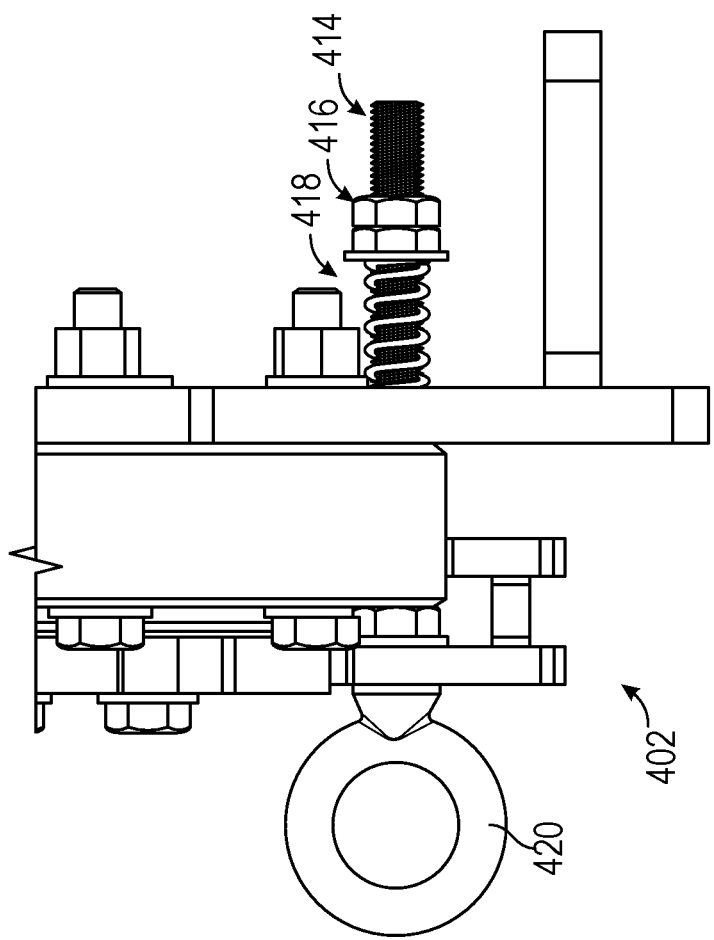

FIG. 4A and FIG. 4B depict a side view and a closeup view of cutting device 202, bearing 308, base mounting bracket 314, and locking mechanism 402. In some embodiments, locking mechanism 402 may lock the roll position of cutting device 202. Base mounting bracket 314 may rotate relative to base plate 318. Bearing 308 may comprise interior ball bearings providing rotation of base mounting bracket 314 attached to interior bearing plate 404. As cutter roll actuator 218 generates rotation, shaft 406 rotates rotating cutting device 202. Furthermore, as cutter roll actuator 218 generated rotation, base mounting bracket 314 rotates rotating bracket 304 and sensor 306. As lock joint 408 is disposed in base mounting bracket 314, lock joint 408 also rotates. Locking mechanism 402 may comprise protrusion 410 for locking into lock joint 408. Locking mechanism 402 may be coupled to bearing housing 412 that may be attached to base plate 318. Therefore, as base mounting bracket 314 rotates, locking mechanism remains stationary such that lock joint 408 may rotate into a position such that lock joint 408 and protrusion 410 are aligned. When protrusion 410 and lock joint 408 are aligned, protrusion 410 may be disposed into lock joint 408 preventing base mounting bracket 314, and cutting device 202, from rotating.

Further, in some embodiments, locking mechanism 402 comprises bolt 414, nuts 416, spring 418, and ring pin 420. Spring 418 may be attached to ring pin 420 such that when protrusion 410 and lock joint 408 are aligned, spring 418 may pull protrusion 410 into lock joint 408 locking base mounting bracket 314 in place and preventing rotation.

In some embodiments, ring pin 420 may be manually operated by a user pulling the ring thus, removing protrusion 410 from lock joint 408. Furthermore, ring pin 420 may be manually operated for a user to place protrusion 410 into lock joint 408. In some embodiments, operator 112 may manually rotate cutting device 202 and sensor 306 by grasping handle 320 and forcibly rotating. This process may be performed on the ground prior to raising cutting device 202 by aerial device 100.

In some embodiments, locking mechanism 402 is fully automated. Locking mechanism 402 may comprise an actuator connected to controller 312. The actuator may be an electromechanical actuator and may operate ring pin 420 or any other part of locking mechanism 402 that may lock base mounting bracket 314. Operator 112 may communicate to controller 312 that cutting device 202 is aligned for cutting. Controller 312 may then operate cutter roll actuator 218 and locking mechanism 402 to lock into place preventing cutting device 202 from rotating while cutting. In some embodiments, operator 112 may initiate cutting or provide input to a button, switch, or provide movement to hand controls 114 to indicate that cutting device 202 is aligned. In some embodiments, the plurality of sensors (e.g., camera 118 and sensor 306) associated with cutting system 200 may detect that cutting device 202 is aligned, that there are no obstructions, and that there is no electrical energy detected, and move into locked mode, or cutting mode, for cutting.

Figure 5:
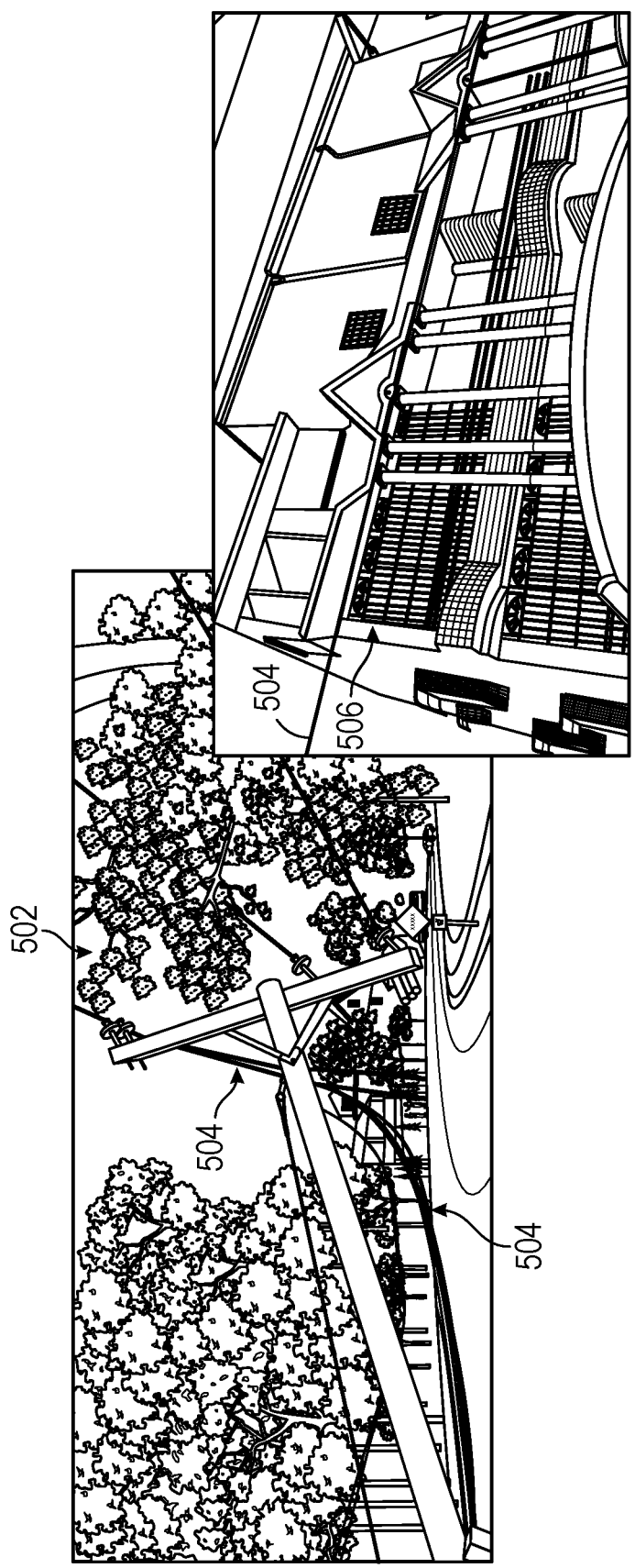
FIG. 5 depicts exemplary use cases for the cutting system.

FIG. 5 depicts exemplary environments in which cutting system 200 may be used. As described above, FIG. 5 depicts exemplary use cases for cutting system 200. In a first example, a storm has knocked down a utility pole and a three-phase conductor is on the ground with power lines 504 in a tree. Here, tree limbs 502 and possibly power lines 504 may need to be cut. As described above, operator 112 may operate cutting device 202 to cut tree limbs 502. Furthermore, operator 112 may cut power lines 504 when no, or low, voltage or current is detected.

In a second exemplary scenario, cutting system 200 may be used to cut bars 506 on a second story window. In this example, a person may be trapped on the second floor due to fire, earthquake, flooding, or the like. Operator 112 may operate cutting device 202 to cut bars 506 to gain access to the person trapped inside. Aerial device 100 may then be equipped with an aerial platform to bring down the person. In some embodiments, cutting system 200 may be disposed on a fire truck, boom truck, or other first responder vehicle. Cutting system 200 may be used in any use case where aerial cutting of any material is necessary.

Figure 6:
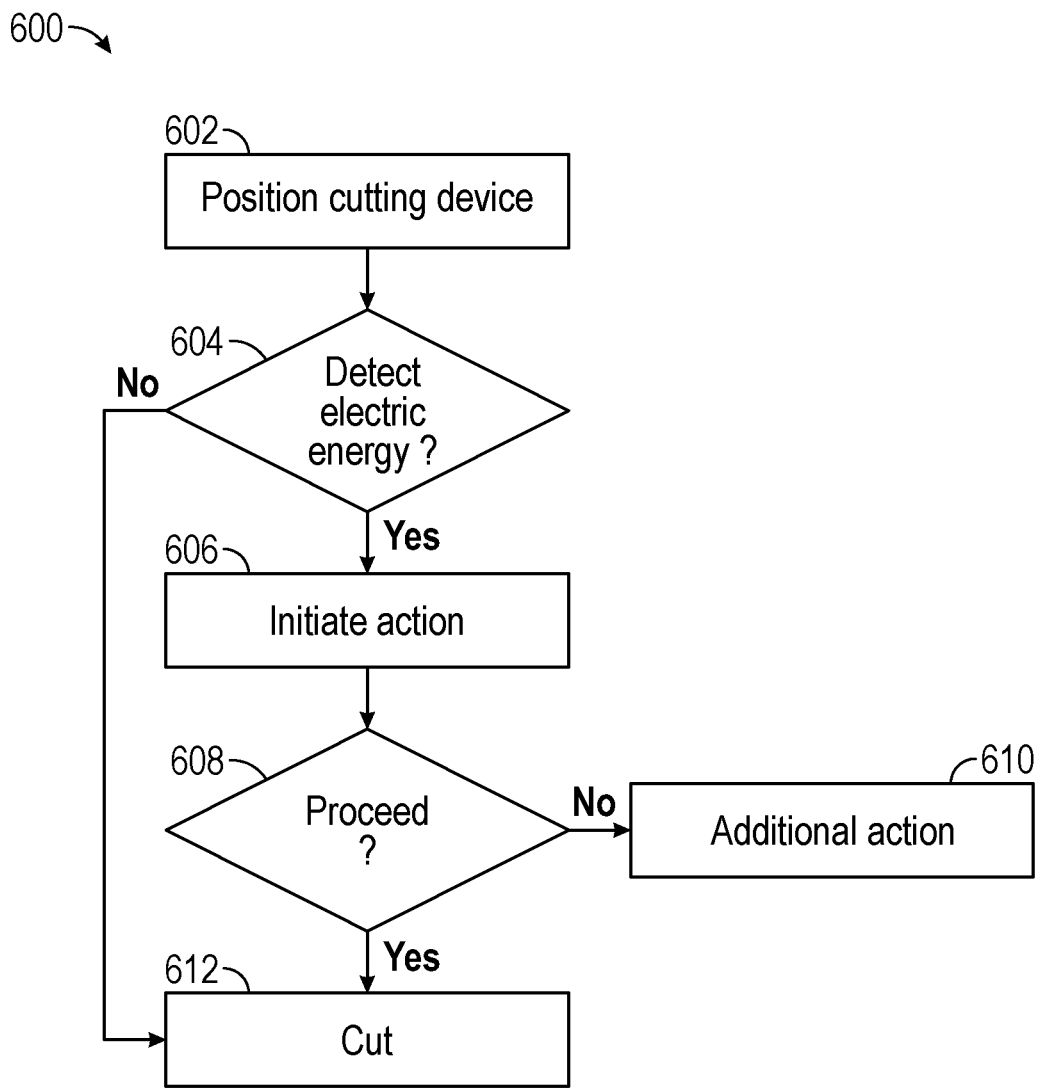
FIG. 6 depicts an embodiment of a method of using the cutting system to cut an object.

FIG. 6 depicts an exemplary process 600 of aerial cutting by embodiments of cutting system 200. At step 602, cutting device 202 may be positioned for cutting as described in embodiments above. Operator 112, using hand controls 114 and head-mounted display 116, may control aerial device 100 as well as cutting system 200 to move cutting device 202 into a position to cut on object. Operator may control boom assembly 104 actuators as well as the plurality of actuators (e.g., yaw cutter actuator and roll cutter actuator) to control linear and rotational motion of cutting device 202. The plurality of actuators may provide two- to six-degree-of-freedom motion. Camera 118 may be in communication with head-mounted display to provide a closeup view of the aerial environment of cutting device 202. Furthermore, camera 118 may be any type of camera to obtain a three-dimensional field of view of the aerial environment such that any obstacles may be determined by object recognition algorithms. Furthermore, the object recognition algorithms may be used to detect the object, the location of the object, and align cutting blades 220 with the object.

At step 604, sensor 306 may detect the electrical energy as described in embodiments above. Sensor 306 may be configured to detect current or voltage. In embodiments where voltage is detected, an electric field potential may be detected. Sensor 306 may be position proximate to cutting device 202 and calibrated to detect the electric field at a specific location in space such as, for example, point 310. Sensor 306 may be mounted on base mounting bracket 314 such that sensor 306 moves in correlation with cutting device 202. Therefore, sensor 306 may retain an optimal detecting position relative to cutting device 202. In some embodiments, a plurality of electric sensors may be used to triangulate the location of the source of the electrical energy. If no electrical energy is detected, in some embodiments, the process moves to the cutting mode at step 612.

Controller 312 may determine that electrical energy was detected by sensor 306. Controller 312 may comprise at least one processor, a data store, and one or more non-transitory computer-readable media storing computer-executable instruction that, when executed by a processor perform the methods described herein. Controller 312 may determine if electrical energy was detected based on the output of sensor 306. Controller 312 may then perform various operations based on whether the electrical energy was detected. In some embodiments, minimum energy threshold may be required to perform the corresponding actions set forth by controller 312.

At step 606, an action may be initiated by the detection of the electrical energy. In some embodiments, a plurality of actions may be performed based on the detection of electrical energy. For example, any actuators associated with aerial device 100 and/or cutting system 200 may be actuated, any alarms or notifications may be activated or sent, any automatic movements to move cutting device 202 away from the detected voltage, and throttling to actuator speeds to aid the operator in retreating from the energized conductor may be actuated. In some embodiments, audible alarms may sound, lights may turn on, or strobe, and haptic feedback may be provided to operator 112 by head-mounted display 116 and hand controls 114. In some embodiments, the audible alarms, lights, and any other information (e.g., distance to object, time, actuator functions, state of aerial device 100, and state of cutting device 202) may be provided to operator 112 by a head-up display (e.g., augmented reality) in head-mounted display 116, on a radio, monitor, mobile device, or the like. In some embodiments, operator 112 may be positioned at the base of aerial device 100, in a nearby trailer, or in a remote office. Any actions described above may be performed based on the detection of the electrical energy.

At step 608, a determination to proceed may be made. In some embodiments, an obstacle may be in the path of cutting device 202. For example, a fallen tree branch may be on a power line that needs to be cut. Operator 112 may decide to use cutting device 202 to remove the fallen tree branch and may remove the branch and proceed. In some instances, the tree branch may not be removed using cutting device 202 and further action may be necessary before cutting the power line. In some embodiments, electrical energy, in the form of current or voltage, may be detected, and operator 112 may have to decide to either cut or not cut. This decision may be based on the level of electrical energy or on the necessity of moving forward with the power line removal. In some embodiments, detection of the electrical energy may initiate an interlock on cutting device 202 such that the power line cannot be cut. The interlock may be initiated based on an electrical energy threshold or a transmission line rating. When the process is halted, the process moves to step 610.

At step 610, additional action may be taken. When voltage has been detected or it is necessary to stop the cutting process because of inoperable conditions, notifications may be sent, alerts (audible and visual) may be initiated, and additional automatic actions may be taken. For example, if the voltage detected is above a minimum threshold value, cutting device 202 may be interlocked, an alarm may be sounded, and lights may be illuminated. Further, notifications may be transmitted to additional vehicles and to a base station where assistance is required. Any of the actions described in step 606 may further be performed at step 610.

At step 612, cutting system 200 may be operated to cut objects. In some embodiments, operator 112 may control cutting device 202 to cut tree limbs, power lines, metal bars, and the like. In some embodiments, cutting system 200 may be autonomous and recognize the tree limbs, power lines, metal bars, and cut autonomously. Either way, cutting blades 220 may be powered by a power source such as, for example, a battery or motor, utilizing electricity, pneumatics, and/or hydraulics for cutting. When the cut is finished, cutting system 200 may be retracted by retracting boom assembly 104 and securing to utility vehicle 102.

Figure 7:
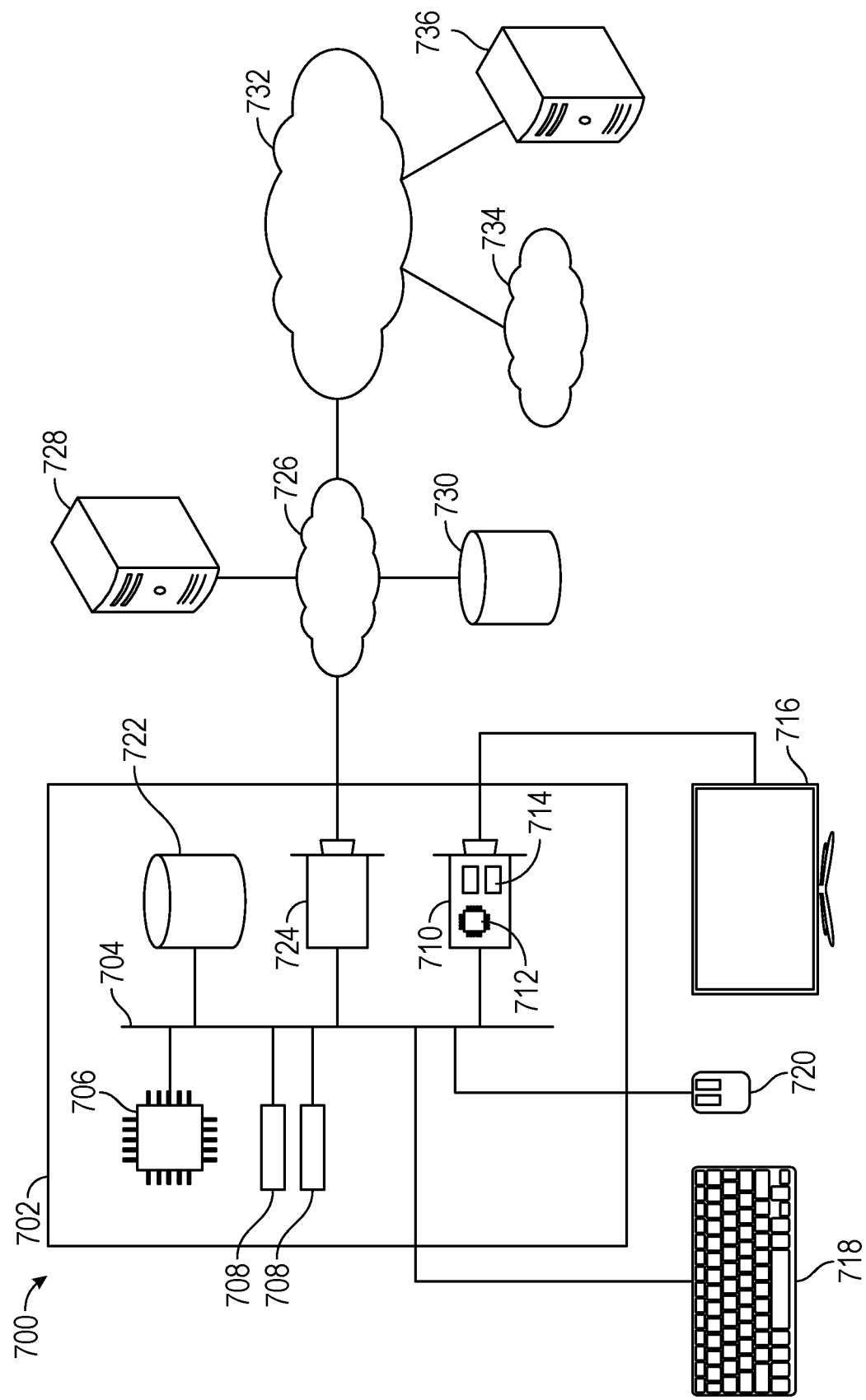
FIG. 7 depicts a hardware system for embodiments of the disclosure.

In FIG. 7, an exemplary hardware platform 700 for certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple buses or components that may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cable 44. Examples of stored information include computer-usable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732. It should be understood that, in some embodiments, computer 702 may be the controller 312 described in reference to FIG. 3 and may perform similar operations.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A remotely operated cutting system attached to a boom tip of an aerial device, the remotely operated cutting system comprising:
   a cutting device comprising:
      one or more cutting blades for cutting;
      a plurality of actuators configured to cause the cutting device to rotate and translate to a cutting position;
      a mount coupling the cutting device to the boom tip;
      a base mounting bracket coupled to the mount and rotatable relative to the mount;
      a rotating bracket coupled to the base mounting bracket and projecting from the base mounting bracket in a direction of the one or more cutting blades,
         wherein the rotating bracket rotates with rotation of the base mounting bracket; and
      a sensor coupled to the rotating bracket and configured to detect electrical energy at a cutting point,
         wherein the sensor rotates and translates with rotation and translation of the rotating bracket to maintain a position of the sensor relative to the cutting device;
   a remote control device communicatively coupled to the cutting device and that is operable to remotely control the cutting device from a remote location, the remote control device comprising:
      a head-mounted display device configured to be used by an operator to remotely operate the cutting device; and
      one or more hand controls associated with the head-mounted display device;
   a plurality of cameras disposed at the boom tip, the plurality of cameras configured to transmit a set of images to the head-mounted display device and
   a controller configured to transmit a first signal to the head-mounted display device to alert the operator and transmit a second signal to prevent the cutting device from cutting when the electrical energy is detected in proximity to the cutting device.

2. The remotely operated cutting system of claim 1, wherein the plurality of actuators is configured to provide at least roll, pitch, and yaw to the cutting device for moving the cutting device into the cutting position.

3. The remotely operated cutting system of claim 1, further comprising a motor,
   wherein the one or more cutting blades are operated by hydraulic, electric, and/or mechanical power generated by the motor.

4. The remotely operated cutting system of claim 1, wherein the controller is further configured to automatically actuate the cutting device to move away from an electrical energy source when the electrical energy is detected.

5. The remotely operated cutting system of claim 1, wherein the controller is further configured to perform:
   determining, by object recognition, an object in the set of images; and
   determining, using the object recognition and data from the sensor, that the object is a source of the electrical energy.

6. The remotely operated cutting system of claim 1, wherein the alert transmitted by the first signal is haptic feedback to the one or more hand controls associated with the head-mounted display device.

7. The remotely operated cutting system of claim 1, wherein the cutting device further comprises:
   a locking mechanism that locks a roll position of the cutting device, comprising:
      a lock joint;
      a protrusion configured to lock into the lock joint when the base mounting bracket rotates,
         wherein when the protrusion locks into the lock joint, the roll position of the cutting device is locked.

8. The remotely operated cutting system of claim 7, wherein the locking mechanism further comprises a spring attached to a ring pin such that when the protrusion and the lock joint are aligned the spring pulls the protrusion into the lock joint to lock the base mounting bracket in place, thereby locking the roll position of the cutting device.

9. A remotely operated cutting system attached to a boom tip of an aerial device, the remotely operated cutting system comprising:
   a cutting device configured to be remotely operated by a remote operator from a remote location, the cutting device comprising:

one or more cutting blades for cutting;
a plurality of actuators configured to cause the cutting device to move to a cutting position;
a mount coupling the cutting device to the boom tip;
a base mounting bracket coupled to the mount and rotatable relative to the mount;
a rotating bracket coupled to the base mounting bracket and projecting from the base mounting bracket in a direction of the one or more cutting blades,
wherein the rotating bracket rotates with rotation of the base mounting bracket; and
a sensor coupled to the rotating bracket and configured to detect electrical energy at a cutting point,
wherein the sensor rotates and translates with rotation and translation of the rotating bracket to maintain a position of the sensor relative to the cutting device;
a remote control operable by the remote operator to control the cutting device at the boom tip from the remote location;
a plurality of cameras transmitting a set of images to an operator remotely operating the cutting device and a boom of the aerial device;
a controller configured to:
receive an output of the sensor;
determine that the electrical energy was detected;
transmit a signal to alert the operator based on the detection of the electrical energy in proximity to the cutting device;
determine, by object recognition, an object in the set of images; and
determine, using the object recognition that the object is an electrical conducting element.

10. The remotely operated cutting system of claim 9, wherein the sensor is configured to detect a direction associated with the electrical energy and the sensor is positioned to detect the electrical energy at the cutting point of the cutting device.

11. The remotely operated cutting system of claim 9, wherein the controller is further configured to determine a three-dimensional position of a source of the electrical energy when the electrical energy is detected.

12. The remotely operated cutting system of claim 9, wherein the controller is further configured to prevent the cutting device from operating when the electrical energy is detected based on the output of the sensor.

13. The remotely operated cutting system of claim 9, further comprising a motor disposed at the boom tip to maintain electrical insulation across a dielectric gap between the boom tip and a base of the aerial device, and
wherein the one or more cutting blades are operated by hydraulics, pneumatics, or electro-mechanics powered by the motor.

14. The remotely operated cutting system of claim 9, wherein the remote operator uses a head-mounted display to operate the cutting device and wherein the remote control communicatively coupled to the cutting device comprises one or more hand controls associated with the head-mounted display.

15. The remotely operated cutting system of claim 14, wherein the alert to the operator transmitted by the signal is haptic feedback to the one or more hand controls associated with the head-mounted display.

16. The remotely operated cutting system of claim 9, wherein the cutting device further comprises:
a locking mechanism that locks a roll position of the cutting device, comprising:
a lock joint;
a protrusion configured to lock into the lock joint when the base mounting bracket rotates,
wherein when the protrusion locks into the lock joint, the roll position of the cutting device is locked.

* * * * *